US011506541B2

(12) United States Patent
Borin (10) Patent No.: US 11,506,541 B2
(45) Date of Patent: Nov. 22, 2022

(54) TEMPERATURE MONITORING DEVICE (71) Applicant: Aptiv Technologies Limited, St. Michael (BB)

(72) Inventor: Boris Borin, Willoughby Hills, OH (US)

(73) Assignee: APTIV TECHNOLOGIES LIMITED

(*) Notice: Subject to any disclaimer, the term of this patent is extended or adjusted under 35 U.S.C. 154(b) by 331 days.

(21) Appl. No.: 16/722,653

(22) Filed: Dec. 20, 2019

(65) Prior Publication Data
US 2020/0217722 A1    Jul. 9, 2020

Related U.S. Application Data (60) Provisional application No. 62/787,856, filed on Jan. 3, 2019.

(51) Int. Cl.
*G01K 1/02* (2021.01)
*G01K 1/024* (2021.01)
*G01K 7/22* (2006.01)
*G01K 13/00* (2021.01)
*H01R 13/66* (2006.01)

(52) U.S. Cl.
CPC .............. *G01K 1/026* (2013.01); *G01K 1/024* (2013.01); *G01K 7/22* (2013.01); *G01K 13/00* (2013.01); *H01R 13/6683* (2013.01)

(58) Field of Classification Search
USPC .......................... 374/141, 208, 183, 110, 166
See application file for complete search history.

(56) References Cited

U.S. PATENT DOCUMENTS

| 9,472,899 B1 | 10/2016 | Reedy et al. |
| 9,493,083 B1 | 11/2016 | Sumner et al. |
| 9,564,719 B1 * | 2/2017 | Oldham ............. H01R 13/6683 |
| 9,634,435 B1 | 4/2017 | Raschilla et al. |

(Continued)

FOREIGN PATENT DOCUMENTS

| CN | 2122441 U | 11/1992 |
| CN | 105375206 A | 3/2016 |

(Continued)

OTHER PUBLICATIONS

First Chinese Office Action for Chinese Application No. 202010005898.7, dated Feb. 1, 2021, 10 pages.

(Continued)

*Primary Examiner* — Mirellys Jagan
(74) *Attorney, Agent, or Firm* — Billion & Armitage (57) ABSTRACT A device comprises a plurality of temperature sensing elements and a control module. The plurality of temperature sensing elements are each arranged proximal to a respective current carrying blade of an electrical plug. The control module receives, from the plurality of temperature sensing elements, a plurality of temperature signals that each indicate a temperature associated with the respective current carrying blades of the electrical plug. The control module also determines a temperature condition of the electrical plug based on the plurality of temperature signals. The control module also communicates an indication of the temperature condition of the electrical plug via an electrical power carrying conductor that supplies electrical power via the electrical plug.

18 Claims, 6 Drawing Sheets

(56) References Cited

U.S. PATENT DOCUMENTS

| | | |
|---|---|---|
| 9,768,554 B2 | 9/2017 | Raschilla et al. |
| 2016/0031335 A1 | 2/2016 | Soden et al. |
| 2016/0039297 A1 | 2/2016 | Kretschmer et al. |
| 2016/0195435 A1 | 7/2016 | Krueger et al. |
| 2016/0288658 A1 | 10/2016 | Rudolph et al. |
| 2017/0077656 A1* | 3/2017 | Beideman ............. H01H 37/74 |
| 2017/0093148 A1* | 3/2017 | Wang ................... F21V 23/023 |

FOREIGN PATENT DOCUMENTS

| | | | | |
|---|---|---|---|---|
| CN | 105449736 A | 3/2016 | | |
| CN | 105675156 A | 6/2016 | | |
| CN | 106058593 A | 10/2016 | | |
| CN | 109103667 A * | 12/2018 | ............. | H01R 13/50 |
| CN | 109449687 A * | 3/2019 | | |
| GB | 1600056 A | 10/1981 | | |
| WO | WO-2016081909 A1 * | 5/2016 | ......... | H01R 13/6592 |

OTHER PUBLICATIONS

"Extended European Search Report for European Application No. 22179127.0 dated Oct. 5, 2022", 10 Pages.

\* cited by examiner

| Data packet sent from grid cord to the IC-CPD | | | | | | |
|---|---|---|---|---|---|---|
| Byte 0 | Byte 1 | Byte 2 | Byte 3 | Byte 4 | Byte 5 | Byte 6 |
| Grid Cord ID | Temp@Location 1 | Temp@Location 2 | Temp@Location 3 | Temp@Location 4 | CRC16MSB | CRC16LSB |
| Above shows one embodiment using a fixed data packet sent at regular time intervals, for example every 1 second. Byte 0 contains unique ID that identifies the grid cord type using, for example, a look up table below. Byte 1 thru Byte 4 are 2's compliment representation of the temperature at location A thru location D with 1 degree Celsius resolution. Byte 5 thru byte 6 are the most significant and least significant byte of 16-bit CRC performed on byte 0 thru byte 4, MSb or LBs first, using $g(x) = x^{16} + x^{12} + x^5 + 1$, or any other generator polynomial. | | | | | | |

| Table of grid Cord IDs | |
|---|---|
| ID value (HEX) | Grid Cord Type |
| 0x00 | Reserved |
| 0x01 | NEMA 5-15 |
| 0x02 | NEMA 5-20 |
| 0x03 | JIS C 8303 |
| 0x04 | CEE 7/16 |
| 0x05 | CEE 7/17 |
| 0x06 | GOST 7396 C 1 |
| 0x07 | CEE 7/6 |
| 0x08 | CEE 7/4 |
| 0x09 | CEE 7/7 |
| 0x0A | SI 32 |
| 0x0B | AS/NZS 3112 |
| 0x0C | GB 1002 |
| 0x0D | IRAM 2073 |
| 0x0E | SEV 1011:2009 |
| 0x0F | 107-2-D1 |
| 0x10 | CEI 23-50 |
| 0x11 | BS 546 |
| 0x12 | IS 1293 |
| 0x13 | SANS 164-1 |
| 0x14 | NBR 14136 2-pin |
| 0x15 | NBR 14136 3-pin |
| 0x16 | SANS 164-2 2-pin |
| 0x17 | SANS 164-2 3-pin |
| 0x18 | TIS 166-2549 |
| 0x19 thru 0xFF | Reserved |

| Data packet sent from grid cord to the IC-CPD | | |
|---|---|---|
| Byte 0 | Byte 1 | Byte 2 |
| Data MSB | Data LSB | Checksum |

| Data packet sent from IC-CPD to the grid cord | |
|---|---|
| Byte 0 | Byte 1 |
| 0x00 | Data Request |

Above shows one embodiment using a data request packet to specify what data is requested from the IC-CPD (see data request table). The grid cord responds back with a packet containing the requested data and the checksum of byte 0 thru byte 1. In this embodiment, the master (IC-CPD) sends the request for desired data to the slave (grid cord). After the master sends the request, it sets the bus to high impedance. The slave, after receiving the packet waits a designated time before responding. This wait time is given to be sufficient to allow the master to switch the bus to high impedance. The masster waits a reasonable time for the slave to respond. If there is no response from the slave the master will repeat the request.

| Table of grid Cord IDs | |
|---|---|
| ID value (HEX) | |
| 0x01 | Data Request |
| 0x18 | Reserved |
| 0x2F | Temp @ Location 1 |
| 0x36 | Temp @ Location 2 |
| 0x4D | Temp @ Location 3 |
| 0x54 | Temp @ Location 4 |
| 0x6B | Highest Temp of 1..4 |
| 0x72 | Highest Temp of 1,4 |
| 0x89 | Highest Temp of 2,3 |
| 0x90 | Delta Temp 1..4 |
| 0xA7 | Delta Temp 1,4 |
| 0xBE | Delta Temp 2,3 |
| 0xC5 | Reserved |
| 0xDC | Reserved |
| 0xE3 | Reserved |
| 0xFA | Grid Cord ID *See table of Grid Cord IDs (Embodiement 1) |
| All other values | Buss Error |

FIG. 7

TEMPERATURE MONITORING DEVICE

CROSS-REFERENCE TO RELATED APPLICATION

This application claims the benefit under 35 U.S.C. § 119(e) of U.S. Provisional Patent Application No. 62/787,856 filed on Jan. 3, 2018, the entire disclosure of which is hereby incorporated by reference.

TECHNICAL FIELD OF THE INVENTION

This disclosure generally relates to a temperature monitoring device, and more particularly relates to a temperature monitoring device for a battery charging cable.

BRIEF SUMMARY OF THE INVENTION

According to one exemplary embodiment, a device includes a plurality of temperature sensing elements each arranged proximally to a current carrying blade of an electrical plug and a control module that receives a plurality of temperature signals that each indicate a current carrying blade temperature associated with the electrical plug from the plurality of temperature sensing elements. The control module also determines a temperature condition of the electrical plug based on the plurality of temperature signals. The control module further communicates an indication of the temperature condition of the electrical plug via an electrical power carrying conductor that supplies electrical power via the electrical plug.

In another exemplary embodiment of the device described above, the control module comprises a microprocessor.

In another exemplary embodiment of the device described above, the control module is disposed within a housing of the electrical plug, and wherein the plurality of temperature sensing elements are arranged non-integrally to the control module.

In another exemplary embodiment of the device described above, the control module is arranged distal from the plurality of temperature sensing elements.

In another exemplary embodiment of the device described above, the plurality of temperature sensing elements comprise thermistors.

In another exemplary embodiment of the device described above, the plurality of temperature sensing elements comprise a first plurality of temperature sensing elements and a second plurality of temperature sensing elements each arranged proximally to the current carrying blade of the electrical plug.

In another exemplary embodiment of the device described above, the control module receives a second plurality of temperature signals that each indicate the current carrying blade temperature associated with the electrical plug from the second plurality of temperature sensing elements and determines the temperature condition of the electrical plug based on a first plurality of temperature signals and the second plurality of temperature signals.

In another exemplary embodiment of the device described above, the control temperature condition of the electrical plug comprises a condition selected from the group consisting of an electrical plug temperature, the current carrying blade temperature, an ambient temperature surrounding the electrical plug, an electrical plug overtemperature condition, a current carrying blade overtemperature condition, and an identification of the current carrying blade.

In another exemplary embodiment of the device described above, the control module is further configured to communicate an indication of a classification of the electrical plug via the electrical power carrying conductor that supplies the electrical power via the electrical plug.

In another exemplary embodiment of the device described above, the classification of the electrical plug includes a classification of the electrical plug according to an electrical standard.

In another exemplary embodiment of the device described above, the indication of the classification of the electrical plug includes the classification of the electrical plug according to a National Electrical Manufacturers Association standard.

In another exemplary embodiment of the device described above, the control module communicates by disrupting the electrical power carried by the electrical power carrying conductor.

In another exemplary embodiment of the device described above, the control module communicates, via disrupting the electrical power according to a predetermined pattern, wherein a first pattern indicates a logic 1 value, and a second pattern indicates a logic 0 value.

In another exemplary embodiment of the device described above, the control module communicates the logic 1 by disrupting the electrical power by a first pulse, and wherein the control module communicates the logic 0 by disrupting the electrical power by a plurality of pulses.

In another exemplary embodiment of the device described above, the control module communicates with an in cable-control protection device via the electrical power carrying conductor.

In another exemplary embodiment of the device described above, the control module and the plurality of temperature sensing elements are disposed on a printed circuit board.

In another exemplary embodiment of the device described above, the PCB defines a plurality of apertures each configured to receive one of the current carrying blades of the electrical plug.

In another exemplary embodiment of the device described above, the plurality of apertures include a first aperture for receiving a first current carrying blade of the electrical plug, a second aperture for receiving a second current carrying blade of the electrical plug, and a third aperture for receiving a ground conductor of the electrical plug.

In another exemplary embodiment of the device described above, the plurality of temperature sensing elements each arranged proximally to the current carrying blade of the electrical plug comprise at least a first temperature sensing element arranged proximally to the first aperture and at least a second temperature sensing element arranged proximally to the second aperture.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figures 1A, 1B:
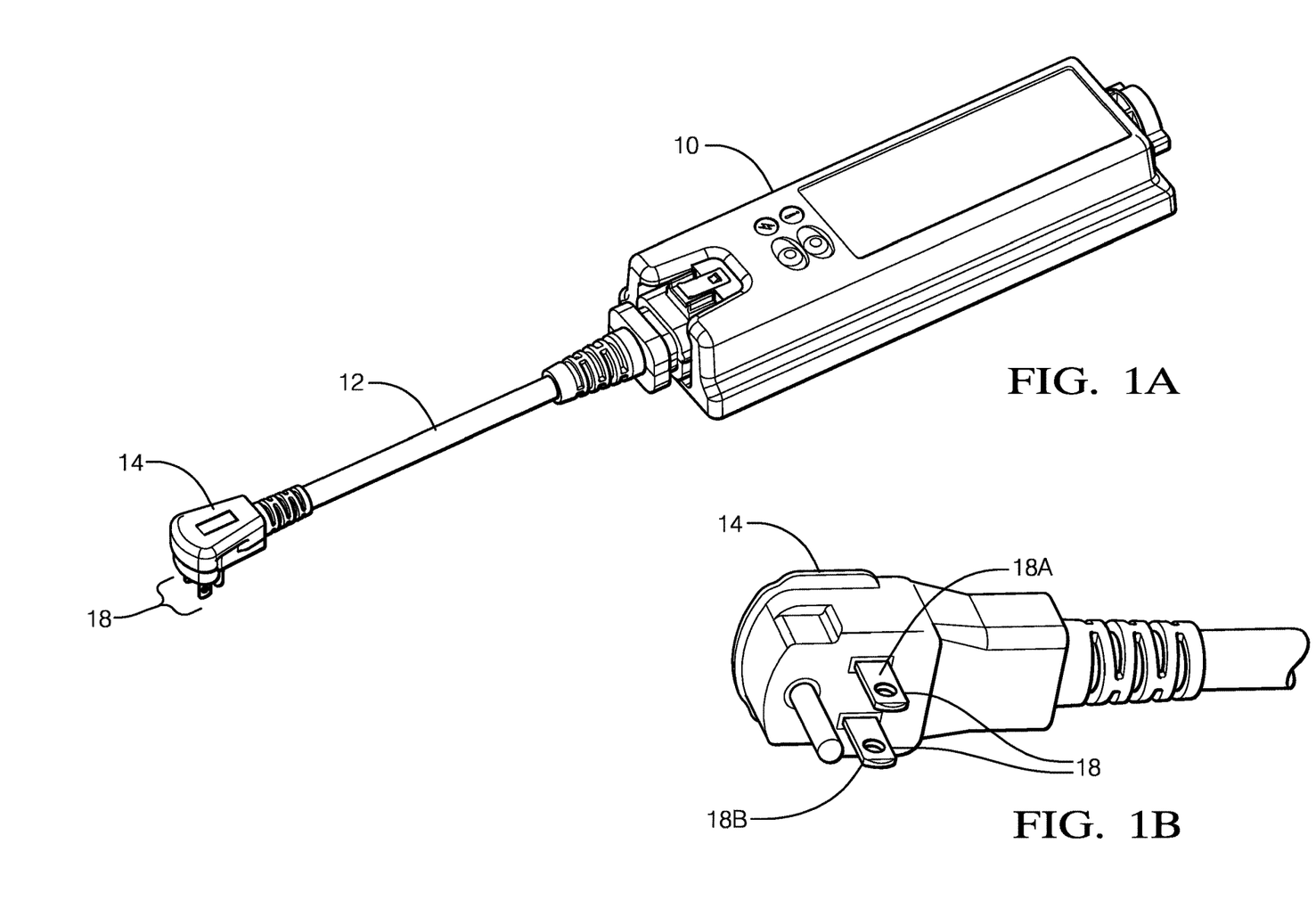
FIG. 1A is an illustration of an electric vehicle supply equipment with a removable grid cord in accordance with one embodiment.
FIG. 1B is an illustration of an electrical plug of the removable grid cord of FIG. 1A in accordance with one embodiment.

FIG. 1A is an illustration of an electric vehicle supply equipment 10 (EVSE 10) with a removable grid cord 12 that is used to charge a battery of an electric vehicle (EV) and/or a battery of a hybrid EV. The removable grid cord 12 may have various electrical plug configurations based on a voltage (V) of a receptacle that delivers electrical power to the electrical plug 14. For example, the electrical plug 14 that is configured for a 120V alternating current (AC) receptacle has two flat current carrying blades 18 and a cylindrical ground conductor. This particular configuration is classified as a NEMA 5-15 electrical plug 14 according to a National Electrical Manufacturers Association (NEMA) standard and is illustrated in FIG. 1B. Other classifications of electrical plugs 14 exist for other voltages, such a 240V AC (e.g., NEMA 6-20), that have different configurations of the current carrying blades 18.

The EVSE 10 is configured to recognize the classification of the electrical plug 14 of the removable grid cord 12 so that the charging of the EV battery may be controlled through a wire cable extending from the EVSE 10 (not shown). For example, when the EVSE 10 recognizes the NEMA 5-15 electrical plug 14, the EVSE 10 delivers 120V AC electrical power to the EV battery and will ensure the maximum allowable current drawn does not exceed the maximum allowed for the electrical plug 14. The EVSE 10 may also enable features such as ground fault detection for electrical plug 14. When the EVSE 10 recognizes the NEMA 6-20 electrical plug 14, the EVSE 10 delivers 240V AC electrical power to the EV battery and will ensure the maximum allowable current drawn does not exceed the maximum allowed for the electrical plug 14. The EVSE 10 may also enable features such as ground fault detection for electrical plug 14. When the EVSE 10 recognizes the CEE7/2 electrical plug, the EVSE 10 delivers 240V AC electrical power to the EV battery and will ensure the maximum allowable current drawn does not exceed the maximum allowed for the electrical plug 14. The EVSE 10 may also disable features such as ground fault detection for this electrical plug 14. In addition, when the battery is fully charged, and/or the EVSE 10 determines that fault condition exists, the EVSE 10 is configured to stop the electrical power delivered to the battery.

Figure 2:
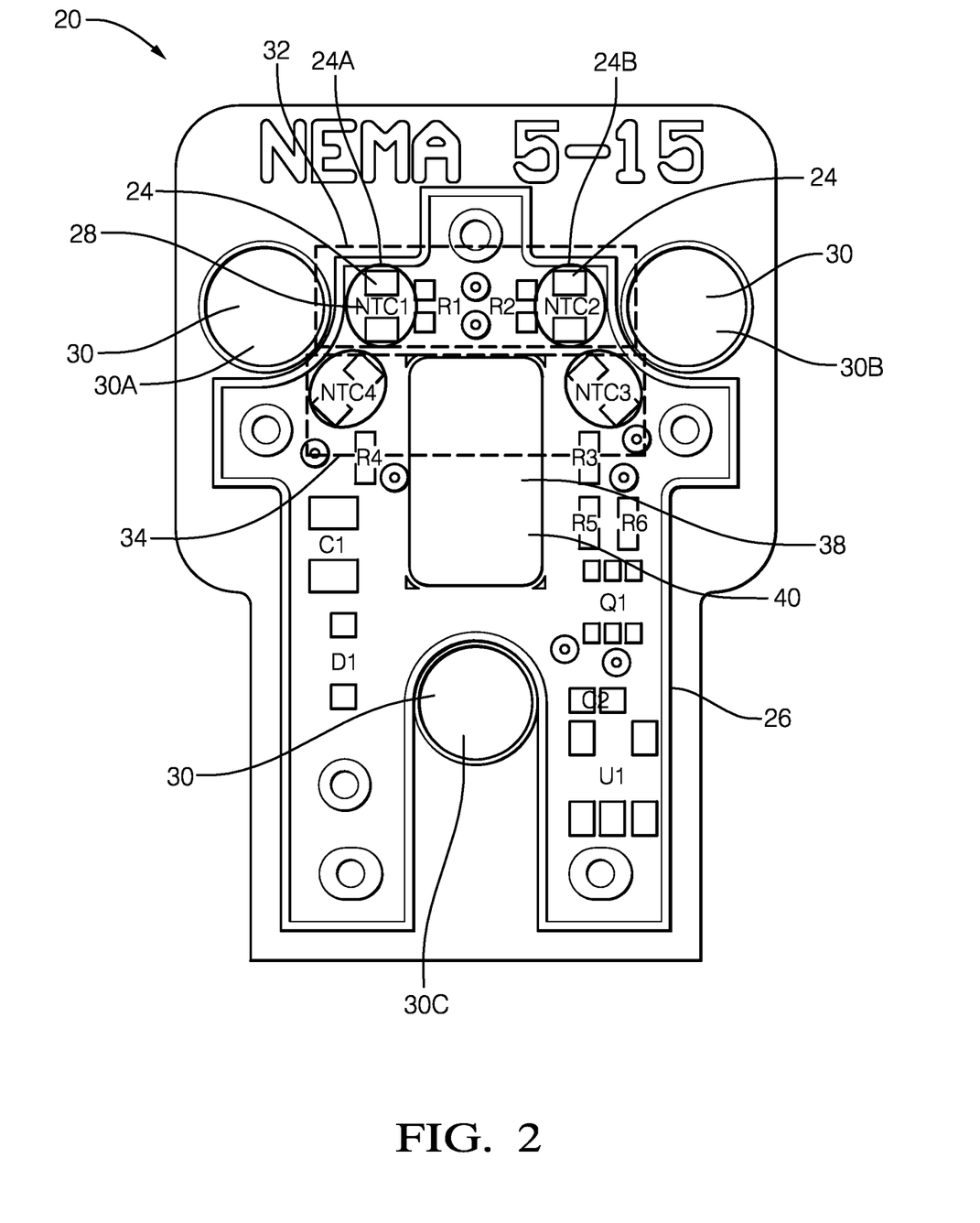
FIG. 2 is an illustration of a printed circuit board with temperature monitoring for the electrical plug of FIG. 1B in accordance with one embodiment.

FIG. 2 illustrates a device 20 configured to monitor a temperature condition of the electrical plug 14. In the example illustrated in FIG. 2, the device 20 is configured to be housed within the NMEA 5-15 electrical plug 14, and for purposes of illustration is isolated from the housing. It will be appreciated that the device 20 may be configured for any classification of the electrical plug 14. The temperature condition of the electrical plug 14 includes a condition selected from the group consisting of: a temperature of the electrical plug 14, the temperature associated with a respective current carrying blade 18, an ambient temperature surrounding the electrical plug 14, an overtemperature condition of the electrical plug 14, an overtemperature condition associated with a respective current carrying blade 18, and an identification of a respective current carrying blade 18.

The device 20 includes a plurality of temperature sensing elements 24 each arranged proximal to the respective current carrying blade 18 of the electrical plug 14. The plurality of temperature sensing elements 24 are mounted to a printed circuit board (PCB) 26 and are indicated by reference indictors NTC1, NTC2, NTC3, and NTC4. The plurality of temperature sensing elements 24 may be any temperature sensing elements 24, and in the example illustrated in FIG. 2 are thermistors 28 having a negative temperature coefficient of resistance.

The PCB 26 defines a plurality of apertures 30 each configured to receive one of the carrying blades 18 of the electrical plug 14. In the example illustrated in FIG. 2, the plurality of apertures 30 include a first aperture 30A for receiving a first current carrying blade 18A, a second aperture 30B for receiving a second current carrying blade 18B, and a third aperture 30C for receiving the ground conductor of the electrical plug 14.

The plurality of temperature sensing elements 24 are each arranged proximal to the respective current carrying blade 18A, 18B of the electrical plug 14 and include at least a first temperature sensing element 24A arranged proximally to the first aperture 30A, and at least a second temperature sensing element 24B arranged proximally to the second aperture 30B. The plurality of temperature sensing elements 24 also comprise a first plurality of temperature sensing elements 32 (e.g., NTC1 and NTC2), and a second plurality of temperature sensing elements 34 (e.g., NTC3 and NTC4), each arranged proximal to each respective current carrying blade 18 of the electrical plug 14.

Figure 3:
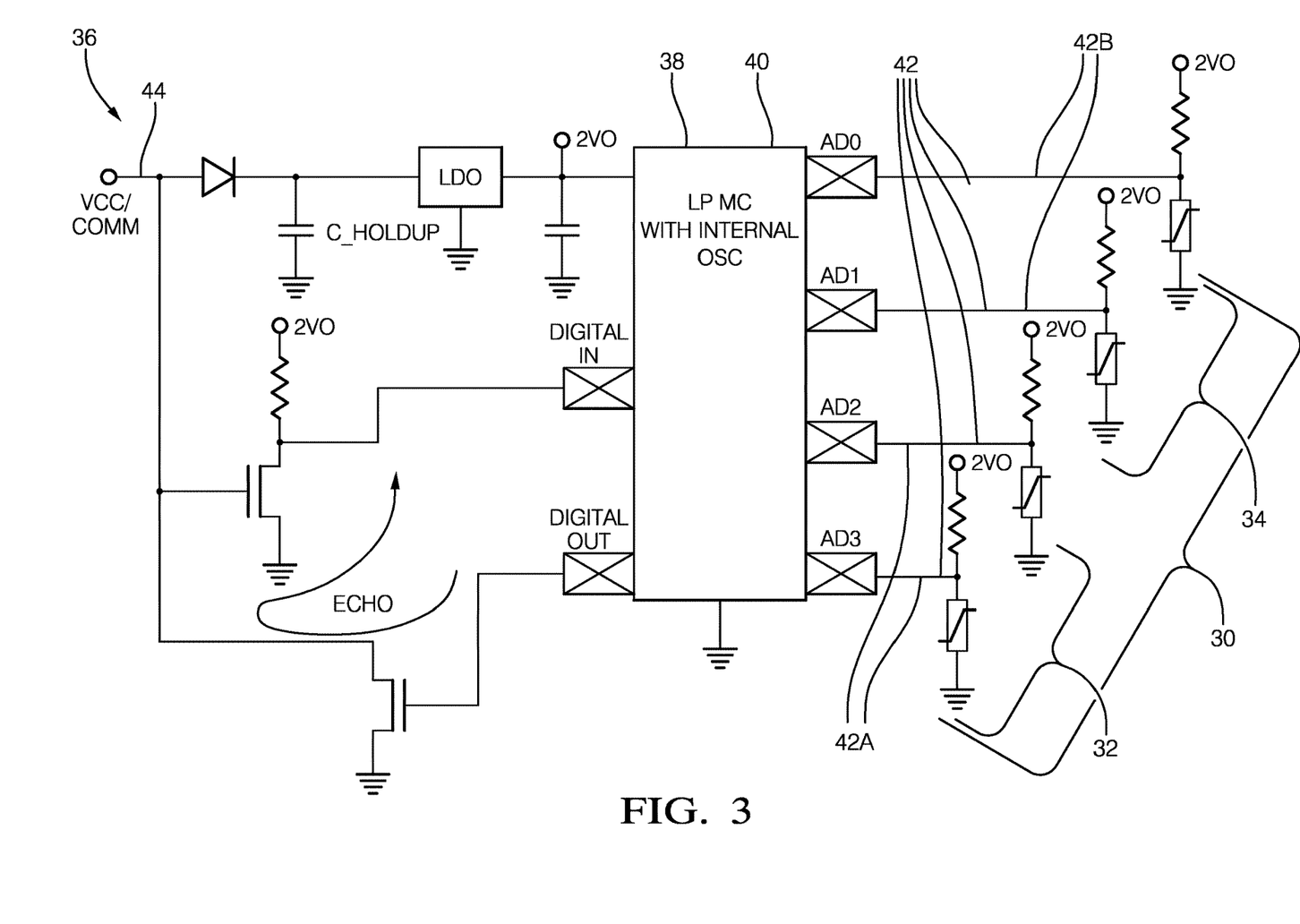
FIG. 3 is a schematic of an electrical circuit for monitoring a temperature of the removable grid cord of FIG. 1 in accordance with one embodiment.

FIG. 3 is an example of a schematic of an electrical circuit 36 of the device 20. The device 20 also includes a control module 38 configured to monitor the plurality of temperature sensing elements 24. The control module 38 may be any control module 38 capable of performing the tasks described herein, and in the example illustrated in FIG. 3, the control module 38 is a microprocessor 40. The control module 38 is disposed within the housing of the electrical plug 14 and is mounted on the PCB 26 distal from the plurality of temperature sensing elements 24. Referring back to FIG. 2, the plurality of temperature sensing elements 24 are arranged non-integrally to the control module 38. That is, the plurality of temperature sensing elements 24 are not contained within the package of the control module 38. This has the technical benefit of improving a response time of the device 20 by enabling the plurality of temperature sensing elements 24 to be located closer to the current carrying blades 18 than would otherwise be possible.

The control module 38 is configured to receive a plurality of temperature signals 42 from the plurality of temperature sensing elements 24. The plurality of temperature signals 42 each indicate a temperature associated with the respective current carrying blades 18 of the electrical plug 14. The control module 38 determines the temperature condition of the electrical plug 14 based on the plurality of temperature signals 42 and communicates an indication of the temperature condition to the EVSE 10. The control module 38 communicates the indication of the temperature condition of the electrical plug 14 via an electrical power carrying conductor 44 that supplies the electrical power via the electrical plug 14.

The control module 38 is configured to receive from the second plurality of temperature sensing elements 34, a second plurality of temperature signals 42B that each indicate the temperature associated with the respective current carrying blades 18 of the electrical plug 14. The control module 38 is further configured to determine, based on a first plurality of temperature signals 42A and the second plurality of temperature signals 42B, the temperature condition of the electrical plug 14.

The control module 38 is further configured to communicate, via the electrical power carrying conductor 44 that supplies the electrical power via the electrical plug 14, an indication of a classification of the electrical plug 14. The indication includes a classification according to the National Electrical Manufacturers Association (NEMA) standard, as well as non-NEMA classified electrical plugs 14 (see FIG. 6) and is stored in a memory (not shown) of the control module 38.

Figure 4:
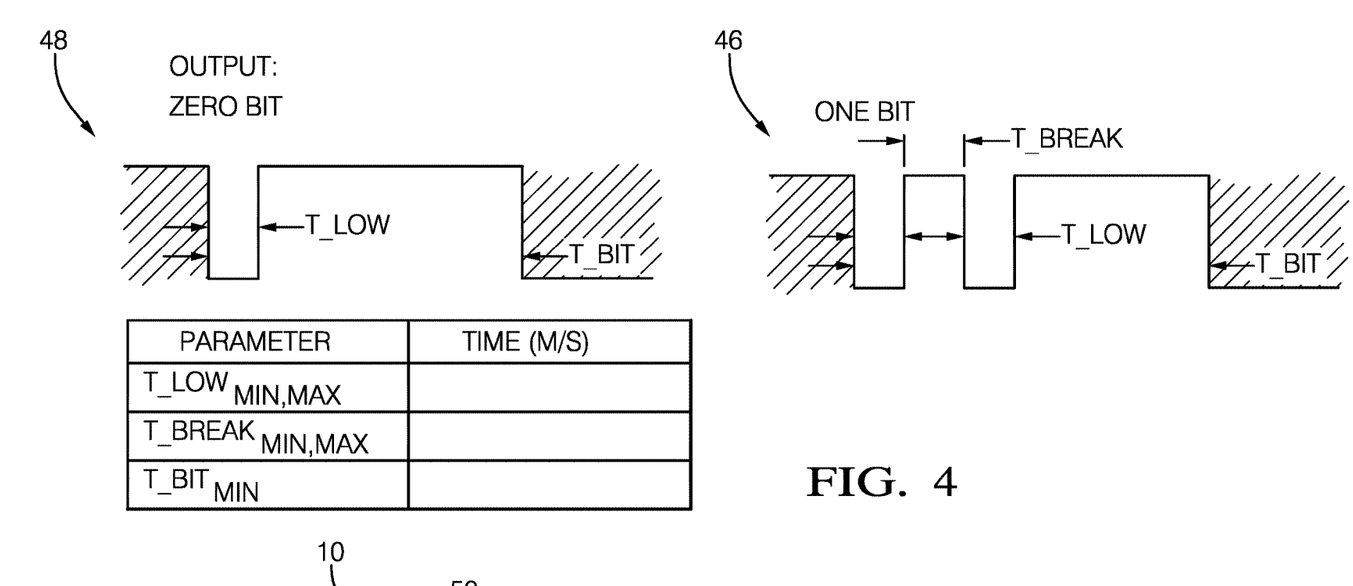
FIG. 4 is a communication protocol for the interface circuit of FIG. 4 in accordance with one embodiment.

FIG. 4 illustrates a communication protocol for the device 20. The control module 38 communicates, via the electrical power carrying conductor 44 that supplies the electrical power via the electrical plug 14, based on disrupting the electrical power carried by the electrical power carrying conductor 44.

The control module 38 communicates, via disrupting the electrical power according to a predetermined pattern, wherein a first pattern 46 indicates a logic 1 value, and a second pattern 48 indicates a logic 0 value. The control module 38 communicates the logic 1 by disrupting the electrical power for a first pulse, and wherein the control module 38 communicates the logic 0 by disrupting the electrical power for a plurality of pulses.

Figure 5:
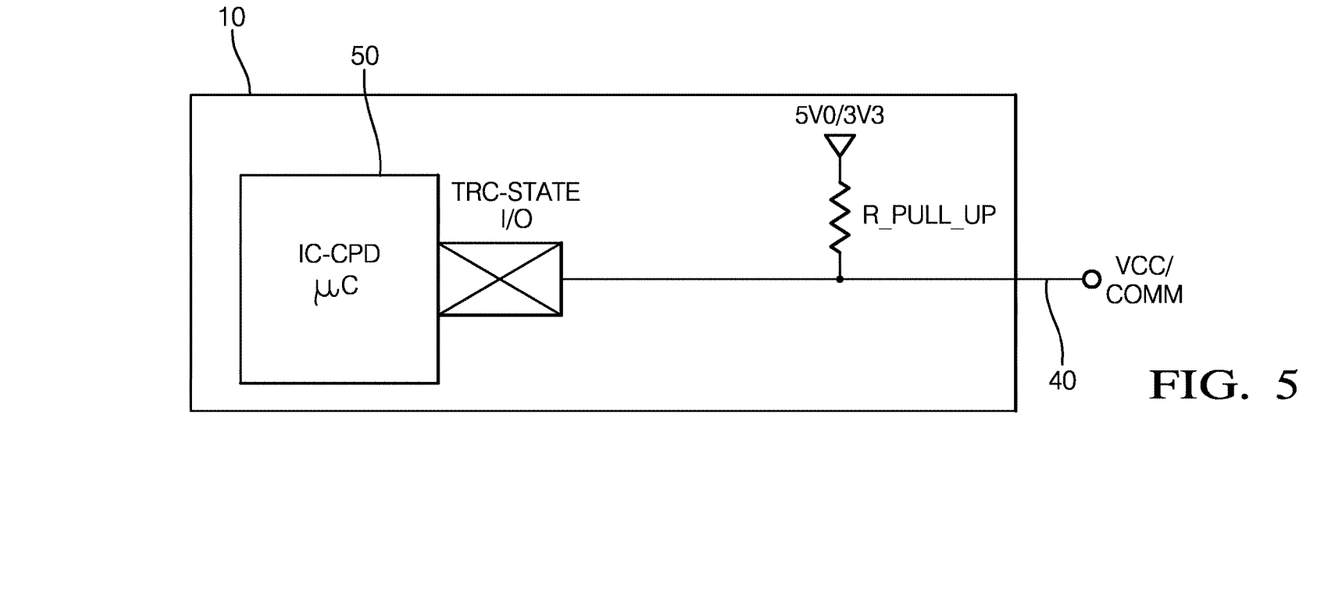
FIG. 5 is a schematic of an interface circuit for the electric vehicle supply equipment of FIG. 1 in accordance with one embodiment.

FIG. 5 illustrates an example of an interface circuit for the EVSE 10 of FIG. 1. The control module 38 communicates, via the electrical power carrying conductor 44, with an in cable-control protection device (IC-CPD) 50.

Figure 6:
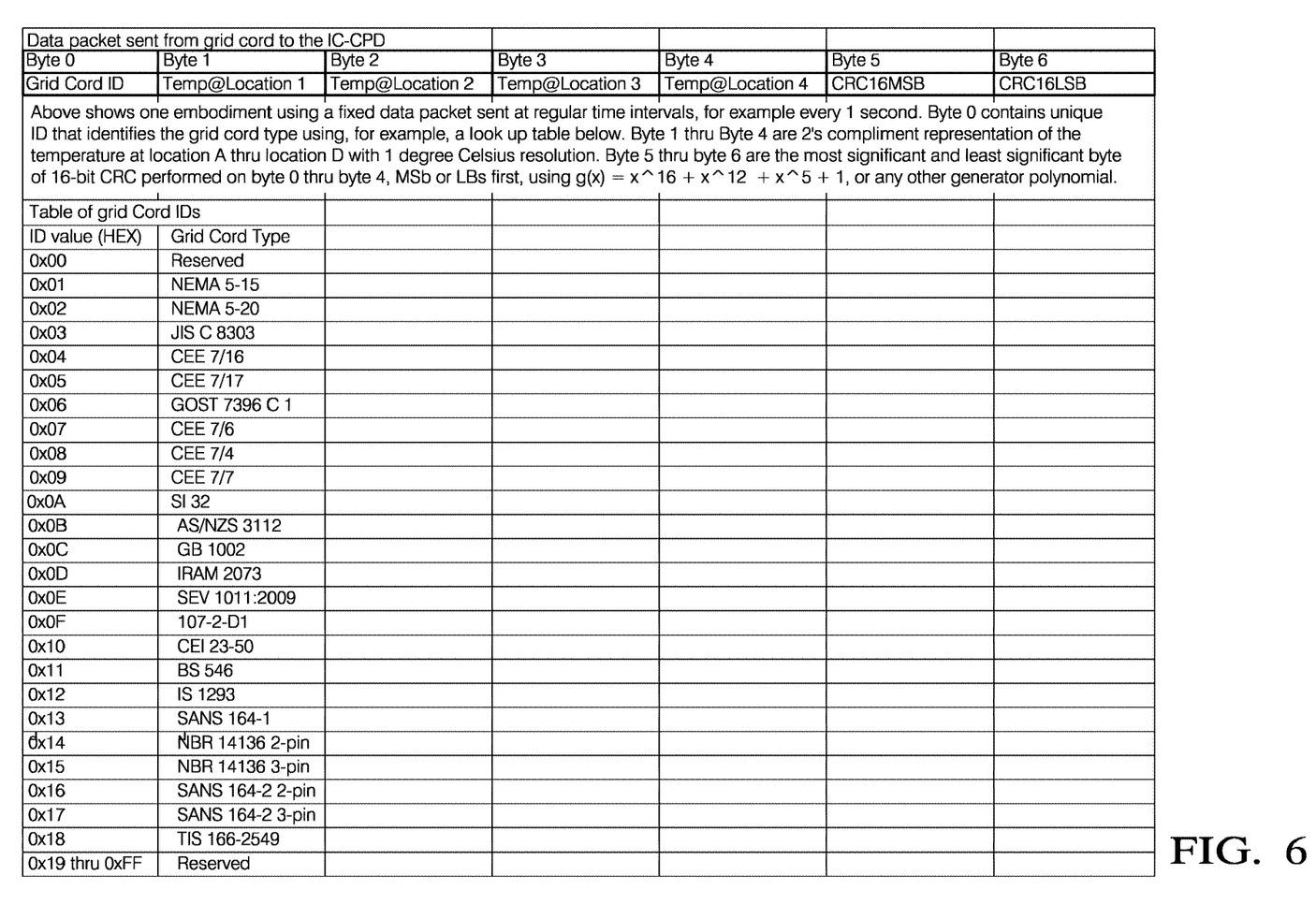
FIG. 6 is an example of a communication between a control module and the interface circuit in accordance with one embodiment.
Figure 7:
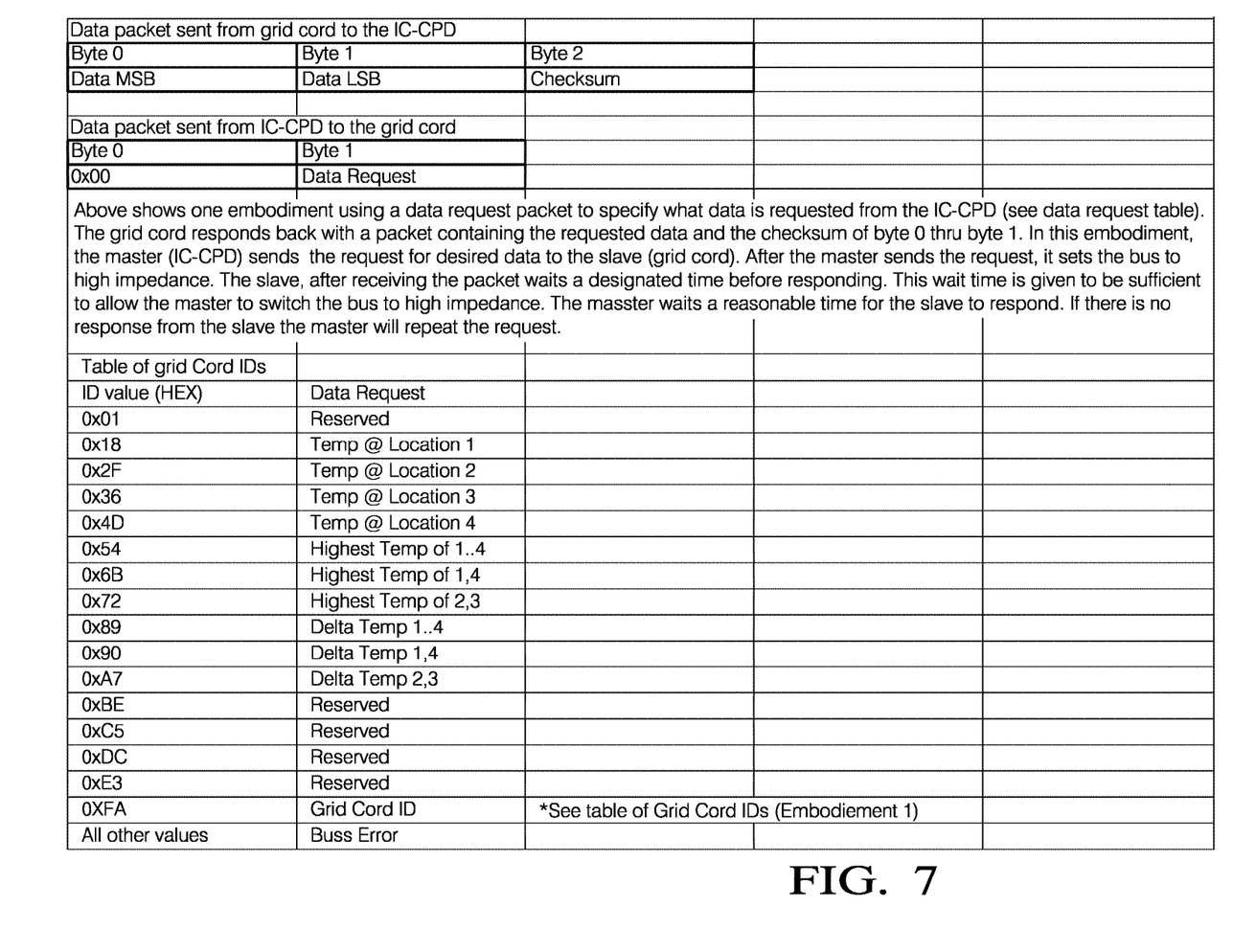
FIG. 7 is an example of a communication between a control module and the interface circuit in accordance with one embodiment.

FIGS. 6 and 7 are examples of the communication between the control module 38 and the IC-CPD 50.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

I claim:

1. A device, comprising:
a plurality of temperature sensing elements each arranged proximally to a current carrying blade of an electrical plug; and
a control module that receives a plurality of temperature signals that each indicate a current carrying blade temperature associated with the electrical plug from the plurality of temperature sensing elements, determines a temperature condition of the electrical plug based on the plurality of temperature signals, and communicates an indication of the temperature condition of the electrical plug by disrupting the electrical power carried by an electrical power carrying conductor that supplies electrical power via the electrical plug according to a predetermined pattern, wherein a first pattern indicates a logic 1 value and a second pattern indicates a logic 0 value.

2. The device of claim 1, wherein the control module comprises a microprocessor.

3. The device of claim 1, wherein the plurality of temperature sensing elements comprise thermistors.

4. The device of claim 1, wherein the temperature condition of the electrical plug comprises a condition selected from the group consisting of: an electrical plug temperature, the current carrying blade temperature, an ambient temperature surrounding the electrical plug, an electrical plug overtemperature condition, a current carrying blade overtemperature condition, and an identification of the current carrying blade.

5. The device of claim 1, wherein the control module communicates the logic 1 value by disrupting the electrical power by a first pulse, and wherein the control module communicates the logic 0 value by disrupting the electrical power by a plurality of pulses.

6. The device of claim 1, wherein the control module communicates with an in cable-control protection device via the electrical power carrying conductor.

7. The device of claim 1, wherein the control module communicates the logic 1 value by disrupting the electrical power with a single pulse, and wherein the control module communicates the logic 0 value by disrupting the electrical power with a plurality of pulses.

8. The device of claim 1, wherein the control module is disposed within a housing of the electrical plug, and wherein the plurality of temperature sensing elements are arranged non-integrally to the control module.

9. The device of claim 8, wherein the control module is arranged distally from the plurality of temperature sensing elements.

10. The device of claim 1, wherein the plurality of temperature sensing elements comprise a first plurality of temperature sensing elements and a second plurality of temperature sensing elements each arranged proximally to the current carrying blade of the electrical plug.

11. The device of claim 10, wherein the control module receives a second plurality of temperature signals that each indicate the current carrying blade temperature associated with the electrical plug from the second plurality of temperature sensing elements and determines the temperature condition of the electrical plug based on the first plurality of temperature signals and the second plurality of temperature signals.

12. The device of claim 1, wherein the control module is further configured to communicate an indication of a classification of the electrical plug via the electrical power carrying conductor that supplies the electrical power via the electrical plug.

13. The device of claim 12, wherein the indication of the classification of the electrical plug includes a classification of the electrical plug according to an electrical standard.

14. The device of claim 13, wherein the indication of the classification of the electrical plug includes the classification of the electrical plug according to a National Electrical Manufacturers Association standard.

15. The device of claim 1, wherein the control module and the plurality of temperature sensing elements are disposed on a printed circuit board.

16. The device of claim 15, wherein the device comprises a plurality of current carrying blades and wherein the printed circuit board defines a plurality of apertures each configured to receive one of the plurality of current carrying blades of the electrical plug.

17. The device of claim 16, wherein the plurality of apertures include a first aperture for receiving a first current carrying blade of the plurality of current carrying blades, a second aperture for receiving a second current carrying blade of the plurality of current carrying blades, and a third aperture for receiving a ground conductor of the electrical plug.

18. The device of claim 17, wherein the plurality of temperature sensing elements each arranged proximally to the first or second current carrying blade of the electrical plug comprise at least a first temperature sensing element arranged proximally to the first aperture and at least a second temperature sensing element arranged proximally to the second aperture.

* * * * *